(12) United States Patent
Lokkinen

(10) Patent No.: US 10,005,168 B2
(45) Date of Patent: *Jun. 26, 2018

(54) DEVICE AND ARRANGEMENT FOR MILLING INNER SURFACE OF PIPE

(71) Applicant: Picote Oy Ltd., Porvoo (FI)

(72) Inventor: Mika Lokkinen, Tallinn (EE)

(73) Assignee: Picote Solutions Oy Ltd., Porvoo (FI)

( * ) Notice: Subject to any disclaimer, the term of this patent is extended or adjusted under 35 U.S.C. 154(b) by 73 days.

This patent is subject to a terminal disclaimer.

(21) Appl. No.: 14/902,855

(22) PCT Filed: Jul. 4, 2014

(86) PCT No.: PCT/FI2014/050559
§ 371 (c)(1),
(2) Date: Jan. 5, 2016

(87) PCT Pub. No.: WO2015/001195
PCT Pub. Date: Jan. 8, 2015

(65) Prior Publication Data
US 2016/0167189 A1 Jun. 16, 2016

(30) Foreign Application Priority Data
Jul. 5, 2013 (FI) .................................. 20135742

(51) Int. Cl.
*B24B 5/40* (2006.01)
*B24D 13/06* (2006.01)
*B08B 9/043* (2006.01)
*B08B 9/045* (2006.01)
*B24B 27/033* (2006.01)
(Continued)

(52) U.S. Cl.
CPC ................ *B24B 5/40* (2013.01); *B08B 9/045* (2013.01); *B08B 9/0436* (2013.01); *B24B 5/363* (2013.01); *B24B 27/033* (2013.01); *B24B 29/08* (2013.01); *B24D 13/06* (2013.01); *B24D 13/20* (2013.01); *B26D 3/163* (2013.01); *B08B 9/051* (2013.01); *B08B 9/0535* (2013.01); *B29C 63/0013* (2013.01); *F16L 2101/12* (2013.01)

(58) Field of Classification Search
CPC .......... B23D 21/14; B24D 5/363; B24D 5/40; B24B 27/033; B26D 3/163
USPC ..................... 83/178, 187; 15/104.09, 104.14
See application file for complete search history.

(56) References Cited

U.S. PATENT DOCUMENTS 1,631,495 A 6/1927 Larc
2,402,223 A 6/1946 Wright
(Continued)

FOREIGN PATENT DOCUMENTS

DE 19530880 2/1997
FI 9377 9/2011
(Continued)

*Primary Examiner* — Omar Flores Sanchez
(74) *Attorney, Agent, or Firm* — Fasth Law Offices; Rolf Fasth

(57) ABSTRACT

The device is for grinding a pipe from an inside. The device has a spindle arranged to be rotated. The device further has protrusions fastened to the spindle. The protrusions have a strip causing an elastic force when being bent. The protrusions are arranged to position the device or a part of the device inside the pipe. The protrusions have blades arranged to grind the inner surface of the pipe, while the spindle is being rotated.

8 Claims, 4 Drawing Sheets

(51) Int. Cl.
*B24B 29/08* (2006.01)
*B24D 13/20* (2006.01)
*B26D 3/16* (2006.01)
*B24B 5/36* (2006.01)
*F16L 101/12* (2006.01)
*B29C 63/00* (2006.01)
*B08B 9/053* (2006.01)
*B08B 9/051* (2006.01)

(56) References Cited

U.S. PATENT DOCUMENTS

| | | | |
|---|---|---|---|
| 2,522,613 A | | 5/1964 | Harrison et al. |
| 3,283,405 A | * | 11/1966 | Braswell ............... E21B 29/005 |
| | | | 30/103 |
| 3,911,574 A | * | 10/1975 | Jones ..................... B23D 21/14 |
| | | | 30/103 |
| D273,194 S | * | 3/1984 | House ......................... D15/139 |
| 5,499,453 A | * | 3/1996 | Brauchitsch ............ E03D 11/17 |
| | | | 30/103 |
| 6,187,105 B1 | | 2/2001 | Matlschweiger |
| 6,467,121 B1 | | 10/2002 | Franzino |
| 2009/0221212 A1 | | 9/2009 | Palushaj |

FOREIGN PATENT DOCUMENTS

| | | |
|---|---|---|
| GB | 958158 | 5/1964 |
| KR | 20110021284 | 4/2011 |
| WO | 2010125238 | 11/2010 |
| WO | 2013072567 | 5/2013 |
| WO | 2013079799 | 6/2013 |

\* cited by examiner

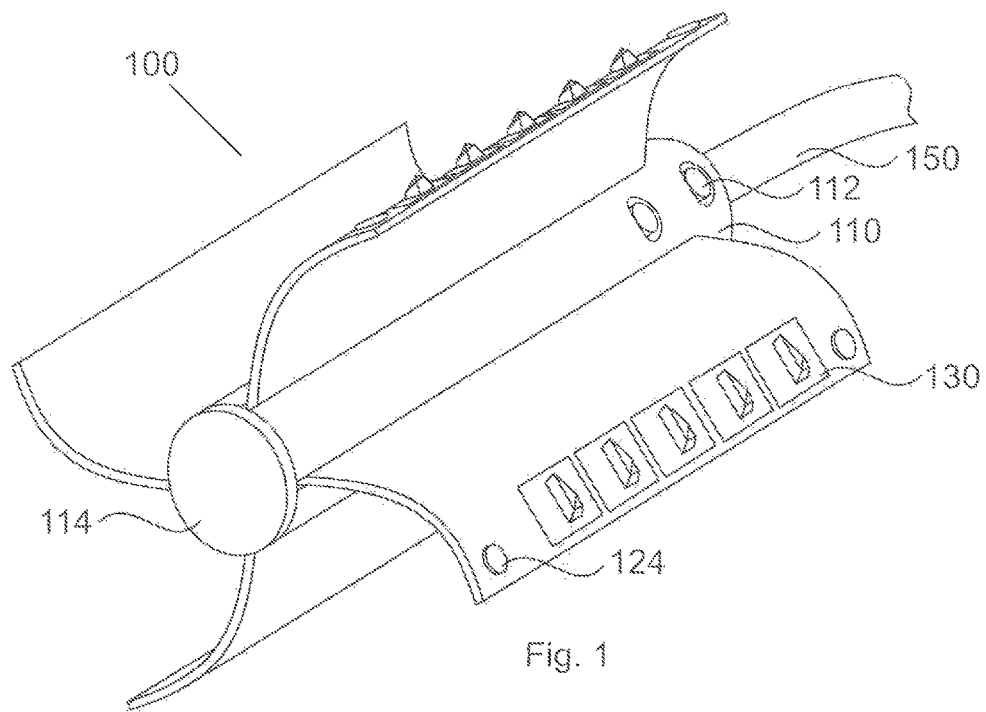
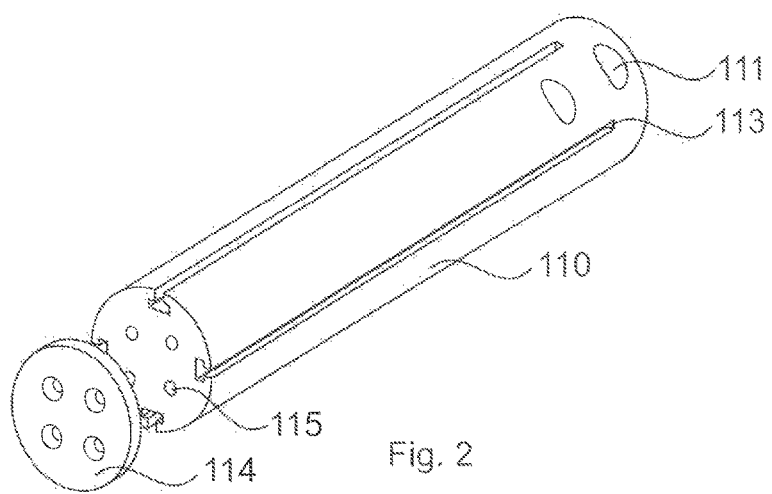

DEVICE AND ARRANGEMENT FOR MILLING INNER SURFACE OF PIPE

PRIOR APPLICATIONS

This is a US national phase patent application that claims priority from PCT/FI2014/050559 filed 4 Jul. 2014, that claims priority from Finnish Patent Application No. 20135742, filed 5 Jul. 2013.

BACKGROUND OF THE INVENTION

The invention relates to a device and arrangement suitable for grinding the inside of a pipe, for instance a pipe liner installed inside a sewage pipe, and to the use of the device for grinding the inner surface of a pipe.

In prior-art solutions, the inner surfaces of sewage pipes have been machined from inside the pipe by means of grinding robots, for example. The robot may have a spherical blade attached to the end of an arm, which blade while rotating grinds the inner wall of the pipe and may be controlled by means of appropriate control devices. The grinding blade is operated by a pneumatic motor, for example. Due to the low torque generated by the pneumatic operation, the rotation speed required for the grinding blade may be very high, such as 10 000 to 30 000 rpm. The robot is pushed to the cutting point inside the pipe by means of rigid push bars.

A problem with the prior-art solutions is that machining is slow and susceptible to errors. For example, an incorrect control command to the robot may damage not only the pipe to be machined, but also another pipe that surrounds the pipe to be machined. Further, it is often difficult to move the grinding robot inside the sewage pipe, possibly through a number of sharp turns, to the desired location. Moving through turns is not always successful, so the grinding robot often has to be used from a different end of the pipe than through which the lining was applied, in which case a drainwell on a street may have to be opened and the street closed for traffic for the duration of the machining.

BRIEF DESCRIPTION OF THE INVENTION

Thus, an object of the invention is to provide a device and arrangement so as to solve the above-mentioned problems. The object of the invention is achieved by an arrangement and device which are characterised by what is disclosed in the independent claims. Preferred embodiments of the invention are disclosed in the dependent claims.

The invention is based on the device having a spindle, to which flexible protrusions or strips may be attached and clamped against the spindle as the device is taken inside a pipe. When the spindle is rotated by a power drill through a cable, for example, the strips are pressed against the inner wall of the pipe. Blades are fastened to the strips, so the blades of the device moving and rotating in the pipe efficiently grind material off the inner wall of the pipe.

The method and system of the invention provide the advantage that the device can be pushed even in a curvy pipe for long distances to the desired machining point to grind the inner surface of the pipe efficiently and easily.

BRIEF DESCRIPTION OF THE DRAWINGS

The invention will now be described in more detail by means of the preferred embodiments and with reference to the accompanying drawings, in which:

FIG. 1 shows a device according to an embodiment of the invention;

FIG. 2 shows a spindle of a device according to an embodiment of the invention;

DETAILED DESCRIPTION OF THE INVENTION

Figure 3:
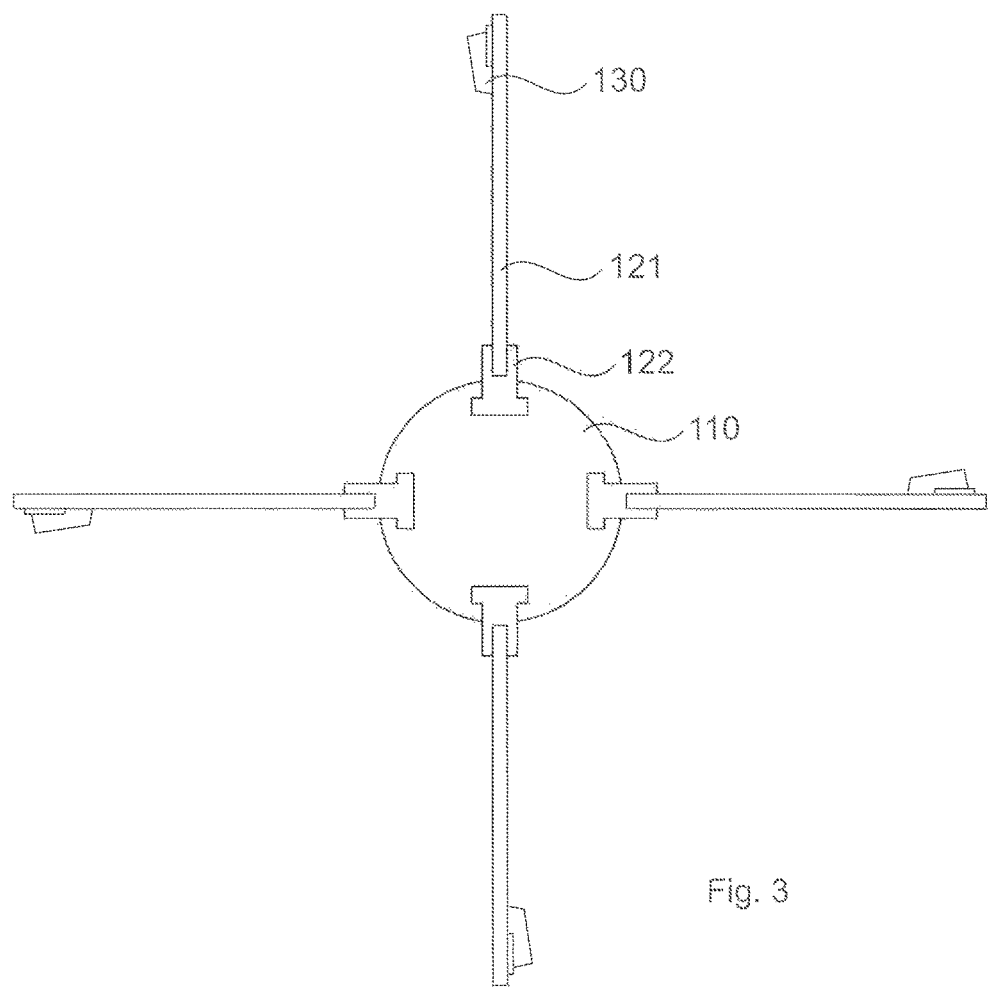
FIG. 3 is a cross-sectional view of a device according to an embodiment of the invention as seen from the direction of the spindle axis.

FIG. 1 shows a device 100 in accordance with an embodiment of the invention. FIG. 2 shows a spindle 110 of a device in accordance with an embodiment of the invention without protrusions fastened to it. The device comprises a spindle 110 with a set of protrusions 120 fastened radially to it. The protrusions preferably comprise a support profile 122 that can be fastened to the spindle 110, and an elastic and/or flexible strip 121 fastened to the support profile. The protrusions are preferably arranged on different sides of the spindle and symmetrical to its rotation axis. One task of the protrusions is to position the spindle, by centring it, for example, inside a pipe in a set of pipes and to keep the longitudinal axis of the spindle 110 parallel to the longitudinal axis of the pipe. The protrusions 120 may be fastened to grooves 113, for instance, by means of fastening screws. A flexible cable 150 is fastened to the spindle by means of fastening means 112, one end (not shown in the figure) of which cable may be provided with a device rotating a machining device, for example a motor that rotates the machining device at a suitable speed. The fastening means 112 may be screws, bolts, rivets, or wedges, for instance, with which the cable 150 is fastened to the spindle 110 by means of openings 111. In a preferred embodiment, the rotation rate of the spindle may be 1 000 to 4 000 rpm, for example.

In an embodiment, the protrusions 120 comprise rubber or some other elastic material that may be reinforced with Kevlar, fabric, or some other textile or reinforcement that improves the strength of the protrusion against tearing, for example. In an embodiment, the protrusions are rubber strips, inside which there is a fabric reinforcement. Since the elastically flexible protrusions that are identical with each other are, in this embodiment, positioned symmetrically on different sides of the spindle, the protrusions together always centre the spindle in the middle of the particular pipe that is to be machined with the device.

The protrusions 120 comprise at least one blade 130 for machining material off the inner surface of the pipe to grind the pipe. While the spindle 110 is being rotated, the protrusions 120 bend and the blades 130 in the vicinity of the outer edge of the protrusions hit the inner surface of the pipe. Each protrusion preferably has several blades at different points of the protrusions so that the blades together grind the inner surface of the pipe as evenly as possible when the spindle is rotated in the pipe. In an embodiment, one protrusion may have for instance two or three, four, five or six blades, or some of the protrusions may be without blades, in which case they merely balance the device. The blade 130 is preferably a grinding blade, but may also be an abrasive or sawing blade.

Figures 6, 7:
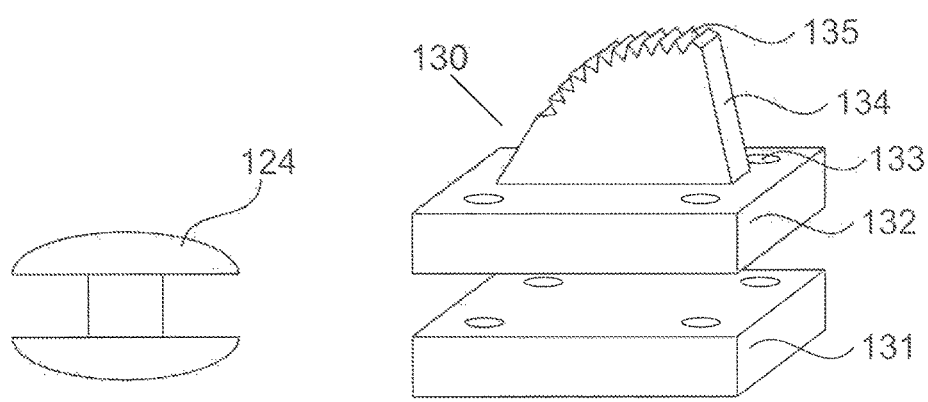
FIG. 6 shows a sliding surface according to an embodiment of the invention.
FIG. 7 shows a blade according to an embodiment of the invention.

In an embodiment, the protrusion may comprise one or more sliding surfaces 124. The sliding surface is preferably elevated from the surface of the strip 121. The friction coefficient between the sliding surface 124 and the inner surface of the pipe is lower than that between the strip and the inner surface of the pipe. When the protrusion comprises a rubber strip, the friction between the rubber strip and the inner surface of the pipe may hinder the rotation of the spindle or unduly heat up the pipe and the rubber strip. In cases like this, in particular, it is preferable to use a sliding surface 124 which slides against the inner surface of the pipe and thus keeps the rubber strip off the inner surface of the pipe. The sliding surface 124 may be formed by means of, for instance, a metal rivet fastened through the protrusion or strip and being preferably rounded on the side that is arranged to be in contact with the inner surface of the pipe. FIG. 6 shows a sliding surface according to an embodiment, and its rivet-like structure, with which the sliding surface 124 can be fastened to the strip 121. In an embodiment, the sliding surface is implemented with a pin or bulge attached to the strip. The sliding surface is preferably of metal, nylon or Teflon. In an embodiment, the sliding surface is a coating on the surface of the strip of the protrusion.

Figure 4A:
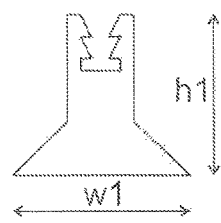
FIGS. 4a, 4b, and 4c show examples of support profiles according to some embodiments.
Figure 4B:
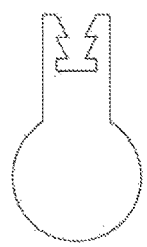
Figure 4C:
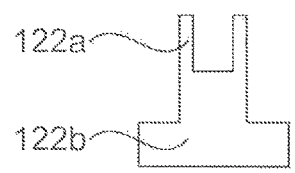

FIG. 3 shows a cross-section of a device in accordance with an embodiment, seen from the direction of the rotation axis of the spindle 110. The figure clearly shows the strips 121 attached to the spindle 110 with support profiles 122. FIGS. 4a, 4b, and 4c show some examples of alternative embodiments for support profiles of a grinding member. FIG. 6 shows a protrusion 120 in accordance with an embodiment, comprising an elongated support profile 122 and an elastic strip 121 attached to the support profile 122. The strip 121 is provided with two sliding surfaces 124 and blade 130. In the embodiment of FIG. 4c, the support profile 121 comprises an upper portion 122a with a rectangular cross-section, having a slot extending, downwards from the upper surface of the upper portion, and a lower portion 122b with a rectangular cross-section. The slot extending downwards from the upper surface of the upper portion 122a of the support profile 122 is provided with the strip 121 preferably with a crimp connection by one of its edges. The cross-section of the support profile 122 has a height direction h1 and a width direction w1. The greatest dimension of the cross-section of the lower portion 122b of the support profile 122 in the width direction w1 is greater than the corresponding dimension of the upper portion 122a. In this way, the support profile 122 becomes locked in the groove 113 in the spindle 110 against a radial and circumferential movement of the spindle 110, when the support profile 122 is pushed into the groove 113 from either of the end surfaces of the spindle 110. In an embodiment, only one end of the spindle 110 has open grooves 113, whereby the grooves do not extend from one end of the spindle 110 to the other, as shown in FIG. 2. In the end of the spindle 110 with the open grooves 113, an end piece 115 is used that may be fastened by screws, for instance, to the threaded screw holes 115 of the spindle 110 end. The threading in the screw holes 115 preferably does not quite extend to the end of the spindle 110, whereby setting all the screws in the end piece 114 simultaneously to the threads is easier.

FIGS. 4a, 4b, and 4c show three alternative embodiments for the support profile. In all the embodiments shown in FIGS. 4a to 4c, the shape of the upper portion 122a of the support profile is rectangular with a slot for the strip. In FIGS. 4a and 4b, the slot has toothing, which prevents the strip from sliding out of the slot after the crimp connection has been made. In the embodiment of FIG. 4a, the cross-section of the lower portion 122b of the support profile 122 is trapezoidal, in FIG. 4b circular, and in FIG. 4c rectangular. In the embodiments shown in FIGS. 4a, 4b, and 4c, the greatest dimension of the cross-section of the lower portion 122b of the support profile 122 in the width direction w1 is greater than the corresponding dimension of the upper portion 122a. The cross-section of the support profile 122 may be whichever, but it must have at least one portion, the greatest dimension of which in the width direction w1 is greater than the corresponding dimension of the upper portion 122a above it in order for the support profile 122 to become locked in the corresponding groove 113 in the spindle 110 against radial and circumferential movement of the spindle 110.

Figure 5:
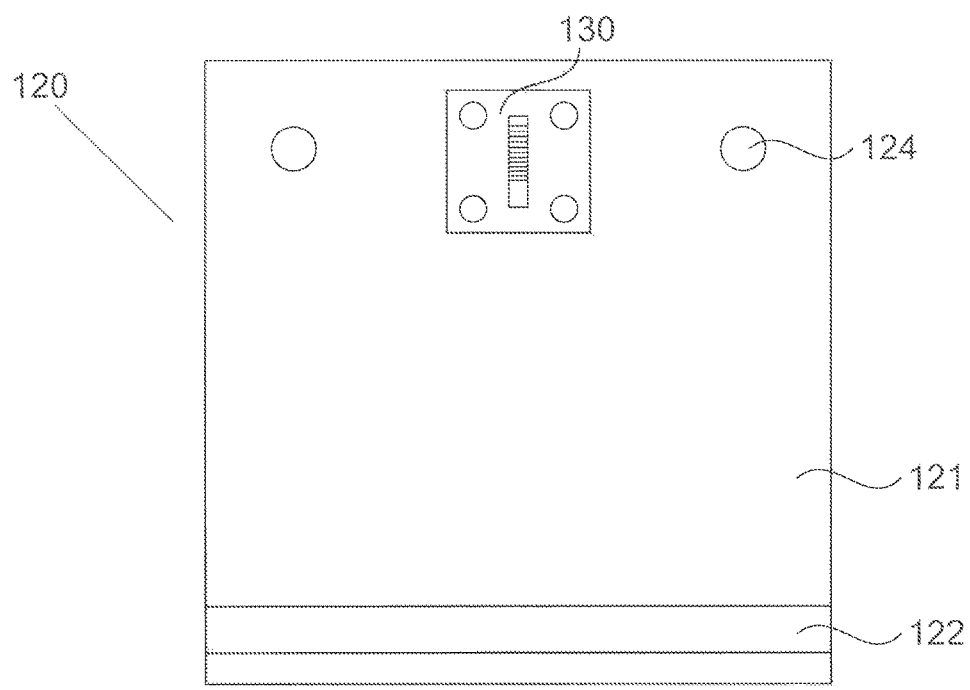
FIG. 5 shows a protrusion according to an embodiment of the invention.

FIG. 5 shows a protrusion 120 according to an embodiment of the invention. The protrusion 120 comprises a support profile 122 and a strip 121 connected with a crimp connection to the slot of the support profile 122. The strip 121 is provided with two sliding surfaces 124 in the vicinity of the outermost corners in relation to the support profile, and a blade 130 at the middle point of the opposite strip 121 side in relation to the support profile 122. By changing the specific weight, size, or mass of the strip 121, it is possible to change the force, with which the blade 130 presses against the inner surface of the pipe. The rotation speed of the spindle 110 also influences the magnitude of this force. If a strip made of the same material and having a standard thickness is always used, it is possible to change the mass of the strip 121 with the strip height extending away from the support profile 122 and the strip length in the direction of the support profile 122, whereby the blade 130 can be made to bite into the inner surface of the pipe either more efficiently, if the mass is increased, or more weakly, if the mass is decreased. The strip height cannot be increased very much, because the strip 121 must not extend onto the blade 130 of the adjacent strip where it would prevent the blade from machining the inner surface of the pipe while the device is rotating in the pipe. Instead, the length of the strip 121 can be increased as necessary, in which case the flexibility of the strip should be taken into account and, if required, more sliding surfaces added in the vicinity of the edge opposite the support profile 122 of the strip 121 in order for the surface of the strip 121 not to hit the inner surface of the pipe to be machined while the spindle 110 is being rotated, which would slow down the rotary motion.

FIG. 7 shows a blade 130 according to an embodiment of the invention. The blade according to the embodiment comprises a cutting head 134 on a bottom plate 132, and a machining surface 135 on the cutting head. The cutting head 134 determines the cutting depth of the blade 130, and by changing the height of the cutting head 134 from the bottom plate 132, it is possible to change the cutting depth. The machining surface 135 of the cutting head 134 of the blade 130 may be serrated or roughened, for example.

In an embodiment, the bottom plate 132 and the cutting head 134 are formed of one piece. In an embodiment, the bottom plate 132 and the cutting head 134 are welded together. In an embodiment, the bottom plate 132 has an opening, through which the upper part of the cutting head 134 fits, and the cutting head 134 has a lower part that is wider and/or longer than the upper part and does not fit through the opening in the bottom plate, whereby the lower part of the cutting head 134 keeps the cutting head attached to the bottom plate 132 when the blade 130 is fastened to the strip. By detaching the blade from the strip, it is possible to remove the cutting head 134 from the bottom plate 130 and replace the cutting head 134 with a new one or one of a different shape. The blade 130 can be fastened to the strip 121 by using a base plate 131 on the other side of the strip, whereby the blade 130 can be fastened to the strip 121 by placing the strip 121 between the bottom plate 132 of the blade and the base plate 131 and, by means of openings 133, the base plate 131, the strip 121 and the bottom plate 132 can be joined to each other, for instance with screws, bolts and nuts, or rivets. In an embodiment, the strip 121 is reinforced in such a way that using a base plate 131 is not necessary, in which case the strip can be directly provided with fastening points corresponding to the openings 133 of the bottom plate 132, and the bottom plate 132 can be directly fastened to the strip 121 with screws, bolts and nuts, or rivets, for instance.

Figure 8:
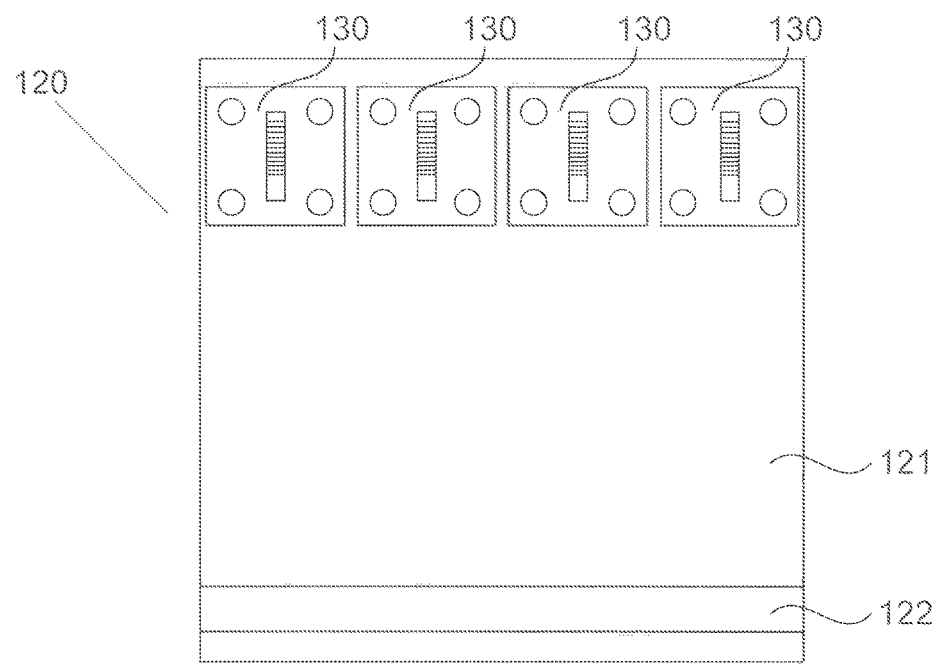
FIG. 8 shows a protrusion according to an embodiment of the invention.

FIG. 8 shows a protrusion 120 according to an embodiment of the invention, which protrusion is particularly suitable for grinding the inside of a pipe. By using protrusions according to the embodiment in connection with the device, the device can be easily used for grinding off the inner pipe, such as a resin-impregnated renovation lining, from a pipe arrangement formed of, for example, two pipes within each other, such as metal pipes renovated with lining technique. The protrusion 120 comprises a support profile 122 and a strip 121 connected with a crimp connection to a slot of the support profile 122. The strip 121 is provided with four blades 130 in a row on the opposite side of the strip 121 relative to the support profile 122. In an embodiment, there are one to ten blades 130, preferably two, three, four, five or six blades in one strip 121. In an embodiment, there are several cutting heads 134, for instance two, three, four, or five cutting heads, arranged in one bottom plate 132 of the blade 130. In an embodiment, in each of the protrusions 120 fastened to one spindle 110, for example in each of the four protrusions, the blades 130 or the cutting heads 134 of the blades are arranged at slightly different points in the strip 121. Preferably, the blades 130 are arranged in the protrusions 120 in such a way that while the spindle 110 is rotating, the cutting heads 134 of the blades cover as large an area as possible of the inner surface of the pipe to be machined.

Figures 9A, 9B:
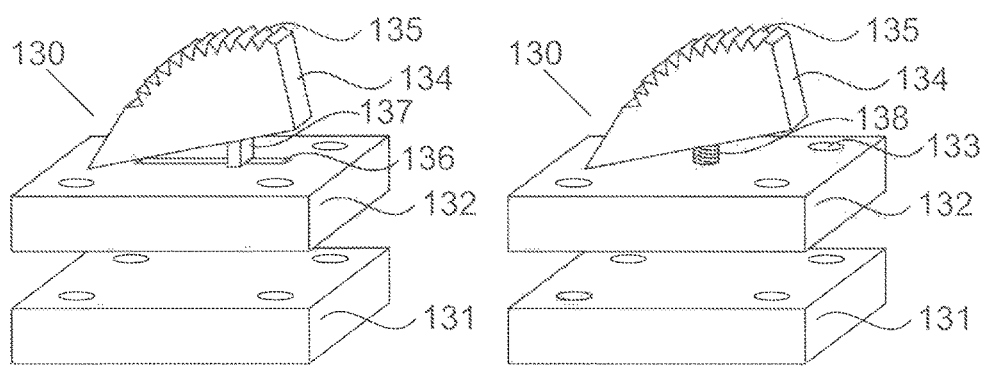
FIGS. 9a and 9b show examples of adjustable blades according to some embodiments.

FIGS. 9a and 9b show examples of blades 130 according to some embodiments, the blades having an adjustable cutting depth. The blade according to the embodiment of FIG. 9a comprises a cutting head 134 on a bottom plate 132, and a machining surface 135 on the cutting head. The cutting head 134 determines the cutting depth of the blade 130, and by changing the height of the cutting head 134 from the bottom plate 132, it is possible to change the cutting depth. The height of the cutting head 134 from the bottom plate can be changed by moving a support 137 along a groove 136 arranged in the bottom plate. The support can be fastened in place for instance with a screw which is arranged in the lower surface of the bottom plate and tightens the support 137 in place in the groove 136. One end of the cutting head is operationally, for example hingedly, fastened to the bottom plate, while the other end of the cutting head is arranged to be movable. With regard to its operating principle, the blade 130 may be an abrasive, grinding, or sawing blade, for example. The machining surface 135 of the cutting head 184 of the blade 130 may be serrated or roughened, for instance.

The blade according to the embodiment of FIG. 9b comprises a cutting head 134 on a bottom plate 132, and a machining surface 135 on the cutting head. The cutting head 134 determines the cutting depth of the blade 130, and by changing the height of the cutting head 134 from the bottom plate 132, it is possible to change the cutting depth. One end of the cutting head is operationally, for example hingedly, fastened to the bottom plate, while the other end of the cutting head is arranged to be movable. The height of the cutting head 134 from the bottom plate can be changed by rotating a threaded adjuster 138 arranged in the bottom plate 132, whereby the adjuster either pushes the end of the cutting head 134 that is arranged to be movable away from the bottom plate or, when rotated in the other direction, allows the end of the cutting head 134 that is arranged to be movable to be lowered closer to the bottom plate. The adjuster 138 may be a screw or a bolt for example, arranged in the bottom plate 132 in such a way that the head of the screw or bolt is reachable either from the upper side of the bottom plate where the cutting head is positioned, or from the lower side of the bottom plate, positioned against the strip 121 when the blade is fastened to the strip. With regard to its operating principle, the blade 130 may be an abrasive, grinding, or sawing blade, for example. The machining surface 135 of the cutting head 134 of the blade 130 may be serrated or roughened, for instance.

It will be apparent to a person skilled in the art that as technology advances, the basic idea of the invention may be implemented in many different ways. The invention and its embodiments are thus not restricted to the examples described above but may vary within the scope of the claims.

While the present invention has been described in accordance with preferred compositions and embodiments, it is to be understood that certain substitutions and alterations may be made thereto without departing from the spirit and scope of the following claims.

I claim:

1. A device for grinding a pipe from inside, comprising: a spindle arranged to be rotated, the device further comprises protrusions fastened to the spindle, the protrusions comprising a strip causing an elastic force when being bent, the protrusions being arranged to position the device or a part of the device inside the pipe, and the protrusions comprising blades arranged to grind an inner surface of the pipe, while the spindle is being rotated; and the protrusion comprises an elongated support profile, a cross-section of the support profile comprising a height direction (h1) and a width direction (w1), the cross-section of the support profile has at least one portion having, a greatest dimension of which in the width direction (w1) is greater than a corresponding greatest dimension that an uppermost portion positioned above the at least one portion in the height direction (h1) has in the width direction (w1), the support profile is lockable in a groove having a corresponding cross-section.

2. The device as claimed in claim 1, wherein the strip comprises at least one of the following materials: fabric, textile, and rubber.

3. The device as claimed in claim 1 wherein the strip further comprises at least one sliding surface for keeping the strip off a pipe wall, a friction coefficient between a sliding surface and the inner surface of the pipe being lower than a friction coefficient between the strip and the inner surface of the pipe.

4. The device as claimed in claim 1 wherein a cutting depth of the blades is arranged to be adjusted with adjusting means for adjusting the cutting depth of the blades.

5. The device as claimed in claim 1, wherein the spindle comprises at least one groove formed on an outer circumference of the spindle, a cross-sectional shape of the groove corresponding to a cross-sectional shape of the support profile of the protrusion, the support profile of the protrusion is pushable from an end surface of the spindle into the groove on the outer circumference of the spindle, in which groove the support profile is arranged to be locked.

6. The device as claimed in claim 5, wherein the protrusion comprises an elastic strip fastened to the uppermost portion in the height direction (h1) of the cross-section of the support profile and protruding from the upper surface of the support profile.

7. The device as claimed in claim 5 wherein the elastic strip is fastened by one of edges of the elastic strip with a crimp connection to the uppermost portion in the height direction (h1) of the cross-section of the support profile.

8. A method of using the device according to claim 1 for grinding the inner surface of a pipe.

\* \* \* \* \*